(12) United States Patent
Needham

(10) Patent No.: US 10,597,997 B2
(45) Date of Patent: Mar. 24, 2020

(54) WELL TOOL PRESSURE TESTING

(71) Applicant: HALLIBURTON ENERGY SERVICES, INC., Houston, TX (US)

(72) Inventor: David B. Needham, Magnolia, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/357,800

(22) PCT Filed: Sep. 27, 2012

(86) PCT No.: PCT/US2012/057653
§ 371 (c)(1),
(2) Date: May 13, 2014

(87) PCT Pub. No.: WO2014/051595
PCT Pub. Date: Apr. 3, 2014

(65) Prior Publication Data
US 2014/0299316 A1    Oct. 9, 2014

(51) Int. Cl.
*E21B 47/00* (2012.01)
*E21B 47/10* (2012.01)
*G01M 3/32* (2006.01)
*G01M 3/28* (2006.01)

(52) U.S. Cl.
CPC .......... *E21B 47/00* (2013.01); *E21B 47/1025* (2013.01); *G01M 3/2815* (2013.01); *G01M 3/3272* (2013.01)

(58) Field of Classification Search
USPC ......................................... 166/250.07, 250.1
See application file for complete search history.

(56) References Cited

U.S. PATENT DOCUMENTS

| 4,090,395 A | 5/1978 | Dixon et al. |
| 4,116,044 A | 9/1978 | Garrett |
| 4,548,069 A * | 10/1985 | Nousak ............... G01M 3/2853 73/49.1 |

(Continued)

FOREIGN PATENT DOCUMENTS

WO    2003/083251 A1    10/2003

OTHER PUBLICATIONS

International Search Report and Written Opinion dated Apr. 24, 2013 for PCT Application No. PCT/US2012/057653, 10 pages.

(Continued)

*Primary Examiner* — Taras P Bemko
(74) *Attorney, Agent, or Firm* — Chamberlain Hrdlicka

(57) ABSTRACT

A method of pressure testing a well tool can include applying positive or negative pressure to an internal chamber of the well tool, or determining a reference pressure, and monitoring the pressure in the internal chamber using a pressure sensor in the internal chamber. Another method can include applying pressure to an internal chamber of a well tool at a surface location, thereby creating a pressure differential in one direction across a seal, and installing the well tool in a well, thereby creating another pressure differential in a possibly opposite direction across the seal. A well system can include a well tool including an internal chamber, and a pressure sensor disposed in the chamber, whereby the pressure sensor detects pressure within the chamber.

29 Claims, 3 Drawing Sheets

(56) References Cited

U.S. PATENT DOCUMENTS

| | | | |
|---|---|---|---|
| 4,601,194 | A | 7/1986 | Miller et al. |
| 5,072,622 | A * | 12/1991 | Roach ................. F16L 58/1036 |
| | | | 73/40.5 R |
| 5,176,025 | A * | 1/1993 | Butts .................... G01M 3/045 |
| | | | 73/40.5 R |
| 5,337,601 | A | 8/1994 | Becker et al. |
| 6,032,699 | A | 3/2000 | Cochran et al. |
| 6,430,990 | B1 | 8/2002 | Mallet |
| 7,165,619 | B2 | 1/2007 | Fox et al. |
| 7,673,655 | B1 | 3/2010 | Morton |
| 7,804,296 | B2 | 9/2010 | Flaum et al. |
| 2003/0164240 | A1 * | 9/2003 | Vinegar ................ E21B 17/003 |
| | | | 166/372 |
| 2007/0277974 | A1 | 12/2007 | Difoggio |
| 2010/0212396 | A1 | 8/2010 | Zenisek |
| 2012/0136579 | A1 | 5/2012 | Kvernvold |

OTHER PUBLICATIONS

Wikipedia, "Tire-Pressure Monitoring System", article, retrieved Sep. 11, 2012 from http://en.wikipedia.org/wiki/Tire-pressure_monitoring_system, 8 pages.

* cited by examiner

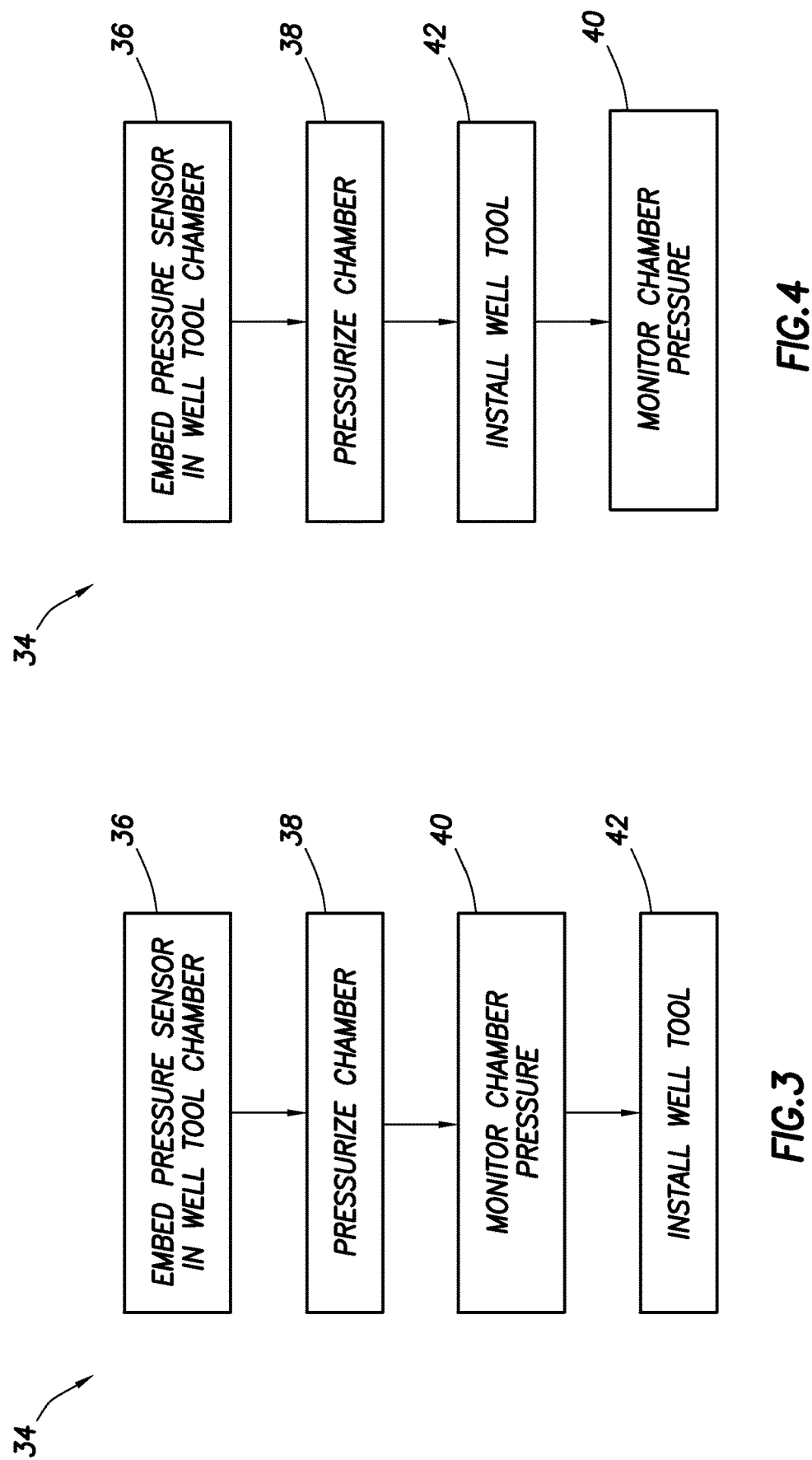

WELL TOOL PRESSURE TESTING

CROSS-REFERENCE TO RELATED APPLICATION

This application is a national stage under 35 USC 371 of International Application No. PCT/US12/57653 filed on 27 Sep. 2012. The entire disclosure of this prior application is incorporated herein by this reference.

TECHNICAL FIELD

This disclosure relates generally to equipment utilized and operations performed in conjunction with a subterranean well and, in one example described below, more particularly provides for pressure testing of well tools.

BACKGROUND

Since well tools are typically exposed to relatively high external pressures in wells, it is common practice to pressure test such well tools by applying suitable external pressure, perhaps functioning the well tools while the external pressure is applied. However, facilities for conducting such external pressure tests (e.g., pressure chambers, high pressure pumps, control systems, safety enclosures, etc.) are not widely available. As a result, many well tools are manufactured, installed, redressed, etc., without having been adequately pressure tested.

It will, therefore, be readily appreciated that improvements are continually needed in the art of constructing and operating well tools.

BRIEF DESCRIPTION OF THE DRAWINGS

FIG. 3 is a representative flowchart for a method which can embody the principles of this disclosure.

FIG. 4 is a representative flowchart for a variation of the FIG. 3 method.

DETAILED DESCRIPTION

Figure 1:
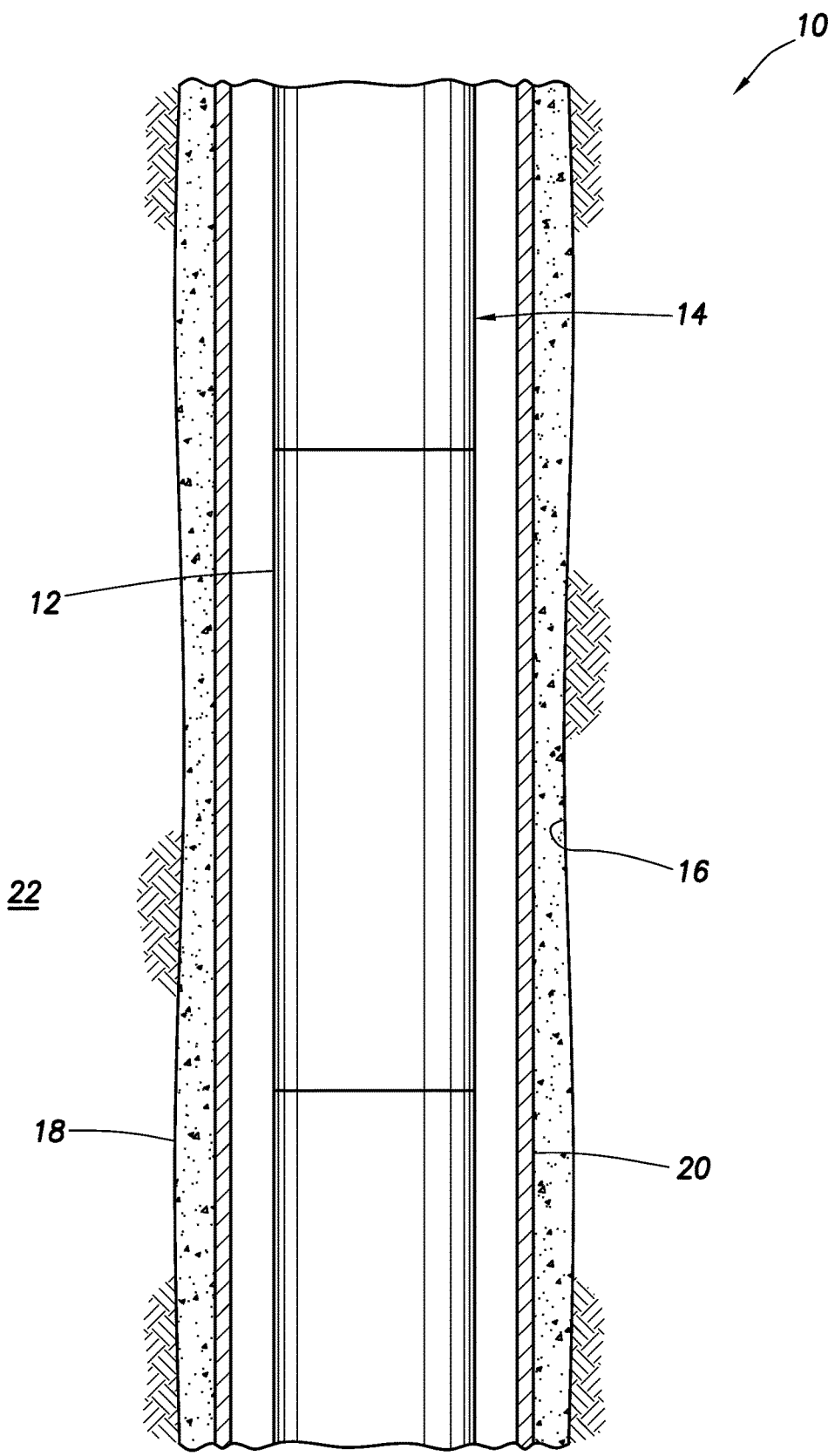
FIG. 1 is a representative partially cross-sectional view of a system and associated method which can embody principles of this disclosure.

Representatively illustrated in FIG. 1 is a system 10 for use with a well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a well tool 12 is connected as part of a tubular string 14 installed in a wellbore 16. The wellbore 16 is lined with cement 18 and casing 20, but in other examples the wellbore could be uncased or open hole.

Note that it is not necessary for the well tool 12 to be connected as part of a tubular string, or for the well tool to be installed in a wellbore. For example, the well tool 12 could in some examples be conveyed by wireline, slickline, a downhole tractor, or any other type of conveyance. The well tool 12 could be positioned at or near the earth's surface or a subsea location. The well tool 12 could be an insert, outsert or sonde. The well tool 12 may be removed from, or installed in, another well tool.

In other examples, the well tool 12 could be installed in a marine riser, in a subsea wellhead, in an earth formation 22 surrounding the wellbore 16, etc. Thus, the scope of this disclosure is not limited to any particular position or manner of conveying the well tool.

The well tool 12 may be any type of well tool. For example, the well tool 12 could comprise a valve, a packer, a well testing tool, a fluid sampler, a formation tester, a logging tool, a perforating tool, a running tool, a fracturing/gravel packing tool, etc. The scope of this disclosure is not limited to any particular type of well tool.

Figure 2:
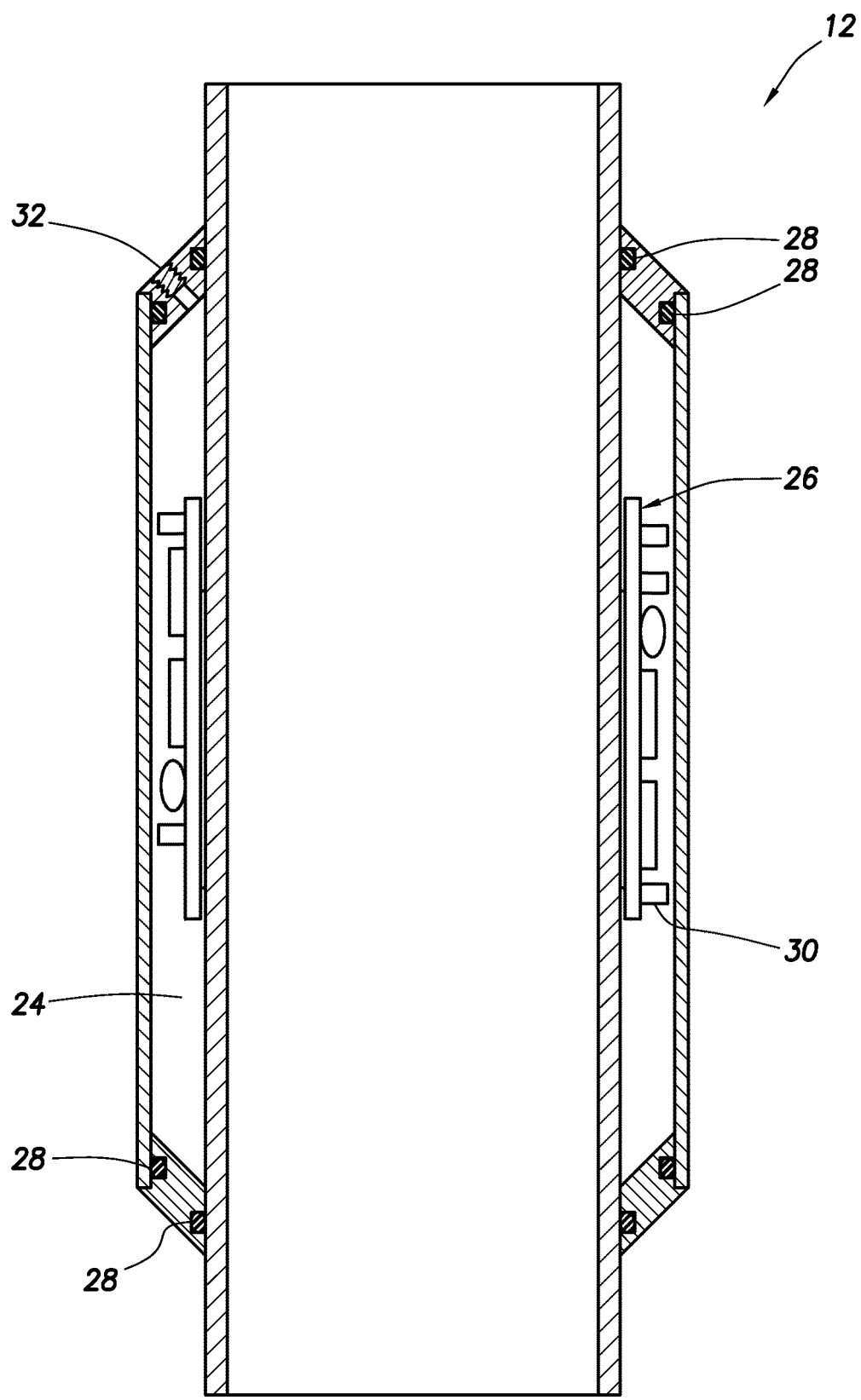
FIG. 2 is an enlarged scale representative cross-sectional view of a well tool which may be used in the system and method of FIG. 1, and which can embody the principles of this disclosure.

Referring additionally now to FIG. 2, an enlarged scale representative cross-sectional view of one example of the well tool 12 is representatively illustrated. In this view, it may be seen that the well tool 12 includes an internal chamber 24 in which an electronic printed circuit assembly 26 is disposed.

It may be desired to isolate the chamber 24 from internal and external pressures and well fluids while the well tool 12 is in the well. For this purpose, seals 28 are provided in the well tool 12. The seals 28 could be of the type known as o-rings, but other types of seals may be used, if desired.

Internally, a flow passage may conduct well fluids through the well tool 12. It may be desired to isolate the chamber 24 from such well fluids and pressures.

However, it is not necessary that seals 28 be used to isolate the chamber 24 from well fluids and pressures. In other examples, welds, threads or any other type of pressure isolating devices may be used instead of, or in addition to, the seals 28.

In addition, it is not necessary for a chamber 24 to be isolated from well fluids and pressures, in keeping with the scope of this disclosure.

A pressure sensor 30 is positioned in the chamber 24. Preferably, the sensor 30 is mounted to the printed circuit assembly 26, but the scope of this disclosure is not limited to any particular mounting position for the sensor.

There may be any number of sensors 30, and any number of chambers 24. There may be any number of sensors 30 per chamber 24.

After the well tool 12 is assembled, it is pressure tested prior to being installed in the well. However, instead of applying external pressure to the well tool 12 (e.g., to at least partially simulate well conditions), pressure is applied internally to the chamber 24. The pressure applied to the chamber 24 could be positive or negative pressure (relative to atmospheric pressure).

For example, a positive or negative pressure of about 2-3 bars could be applied to the chamber 24 at a surface location (such as, a land well site, a floating rig, a jack-up rig, a workshop, etc.) via a port 32. A fluid used to pressurize the chamber 24 could comprise air, nitrogen, another inert gas, etc. The scope of this disclosure is not limited to use of any particular fluid to pressurize the chamber 24. The scope of this disclosure is not limited to any level of pressure applied to the chamber 24.

After the pressure is applied to the chamber 24, the sensor 30 is used to monitor the pressure in the chamber. If the sensor 30 detects a loss of pressure (e.g., in the case of positive pressure being applied to the chamber) or a gain of pressure (e.g., in the case of negative pressure being applied to the chamber), this can be used as an indication of leakage from the chamber 24.

Note that, when the chamber 24 is internally pressurized at the surface location, a pressure differential will be created across each of the seals 28 in one direction (e.g., outward from the chamber to the exterior of the well tool 12, or inward from the chamber to the interior of the well tool). However, when the well tool 12 is installed in the well, pressure will be applied exteriorly and/or interiorly to the well tool, and so a pressure differential across each of the seals 28 will act in an opposite direction (e.g., inward from the exterior of the well tool to the chamber 24, or outward from the interior of the well tool).

The scope of this disclosure is not limited to any particular direction of a pressure differential acting across a seal 28 or other pressure boundary. The scope of this disclosure is not limited to there being any pressure differential at all across a seal 28 or other pressure boundary.

For example, the sensor 30 could detect a deviation from a reference pressure as an indication of leakage from or into the chamber 24, between seals 28, between a seal and a backup ring, or at any other location. Any pressure change detected by the sensor 30 (other than that due to temperature fluctuations, etc.) can indicate a potential problem with the well tool 12. Multiple sensors 30 could detect pressure at multiple respective different locations (e.g., in different chambers 24 or pressure zones, between seals 28, between a seal and a backup ring, etc.).

Thus, in this example, the pressure test described above does not necessarily duplicate well conditions, but the test is sufficient to detect certain defects, such as, missing, damaged, worn, aged or improperly installed seals 28, cracks in pressure bearing housings or welds, leakage past threads, etc. In addition, the pressure test does not require use of bulky and expensive external pressure test chambers, high pressure pumps, control systems, safety enclosures, etc.

When the pressure test is completed, the well tool 12 can be installed in the well, with the pressure sensor 30 remaining in the chamber 24. In this manner, the sensor 30 can continue to monitor pressure in the chamber 24 while the well tool 12 is in the well.

For example, a pressure increase detected by the sensor 30 while the well tool 12 is in the well can indicate an impending failure of the well tool due to well fluids entering the chamber 24. If the chamber 24 is used operationally for storage of fluid pressure (e.g., as a pressurized nitrogen or other gas chamber, as a liquid spring, etc.), the sensor 30 can be used for monitoring the pressure level in the chamber as the well tool 12 is operated in the well. A pressure decrease detected by the sensor 30 can indicate leakage from the fluid pressure storage.

In some examples, the printed circuit assembly 26 may be surrounded by a fluid, so that the chamber 24 can withstand greater external pressure.

Referring additionally now to FIG. 3, a flowchart for a method 34 is representatively illustrated. The method 34 may be used with the system 10 and well tool 12 described above, or it may be used with other systems and/or well tools.

In the method 34, the pressure sensor 30 is embedded in the chamber 24 in step 36. In the example described above, the sensor 30 is mounted to the printed circuit assembly 26, but other techniques for positioning or mounting the sensor in the chamber 24 may be used, if desired.

In step 38, the chamber 24 is internally pressurized. In the example described above, a pressure of only about 2-3 bars is applied to the chamber 24. In some examples, a source of pressure may be chosen because of its convenience to a rig, work facility, etc. A relatively low pressure may be chosen, so that safety risks are minimized, but leakage from the chamber 24 can still be detected by the sensor 30. However, the scope of this disclosure is not limited to any particular positive or negative pressure or level of pressure being applied to the chamber 24.

In step 40, the chamber 24 pressure is monitored using the sensor 30. Preferably, the sensor 30 is conveniently mounted to the printed circuit assembly 26 for supplying electrical power to the sensor, and for transmitting measurements from the sensor (e.g., via wired or wireless means, via optical waveguide, radio frequency identification (RFID), acoustic means, etc.) to an operator in a usable format or display. However, the scope of this disclosure is not limited to any particular way of supplying electrical power to the sensor 30, or of transmitting measurements from the sensor.

In step 42, the well tool 12 is installed in the well. As described above, the well tool 12 may be conveyed into the wellbore 16 by any type of conveyance (or no conveyance), but it is not necessary for the well tool to be positioned within the wellbore 16.

Another example of the method 34 is representatively illustrated in flowchart form in FIG. 4. In this example, the steps 40, 42 are reversed, so that the chamber 24 pressure is monitored using the sensor 30 after the well tool 12 is installed in the well.

This order of steps may be desired to detect leakage into or out of the chamber 24, or any other type of pressure change or lack of change in the chamber, while the well tool 12 is in the well. For example, the sensor 30 may be used to monitor pressure in a pressurized gas chamber, to verify functionality of a liquid spring, to detect impending failure of the well tool 12, etc.

Note that the chamber 24 pressure may also be monitored prior to installing the well tool 12 in the well in the FIG. 4 example. Thus, prior to installation of the well tool 12, the sensor 30 may be used to pressure test the well tool. After installation of the well tool 12, the sensor 30 may be used to monitor pressure in the chamber 24 for various other purposes.

However, the sensor 30 can be used to monitor pressure in the chamber 24 after installation of the well tool 42, whether or not the chamber 24 was previously pressurized. Thus, step 38 in the method 34 of FIG. 4 is optional.

It may now be fully appreciated that the above disclosure provides significant advancements to the art of constructing and operating well tools. In examples described above, a pressure test may be performed on a well tool at a surface location prior to the well tool being installed in a well. Furthermore, a pressure sensor in a chamber of the well tool can be used to monitor pressure in the chamber or between seals during the pressure testing and/or while the well tool is installed in the well.

A method 34 of pressure testing a well tool 12 is described above. In one example, the method 34 can comprise: applying pressure to an internal chamber 24 of the well tool 12; and monitoring the pressure in the internal chamber 24 using a pressure sensor 30 in the internal chamber 24.

The method 34 can also include installing the well tool 12 in a well. The installing step 42 may be performed prior to the monitoring step 40. The monitoring step 40 may be performed prior to the installing step 42.

The applying step 38 can include applying the pressure to a seal 28, thereby creating a first pressure differential in a first direction across the seal 28. The method 34 may include installing the well tool 12 in a well, thereby creating a second pressure differential in a second direction across the seal 28, the second direction being opposite to the first direction. The method 34 may include installing the well tool 12 in a well, thereby creating a second pressure differential in the first direction across the seal 28, the second pressure differential being greater than the first pressure differential.

The method 34 can include mounting the pressure sensor 30 on an electronic printed circuit assembly 26.

The monitoring step 40 may include detecting a pressure decrease in the chamber 24 as an indication of leakage of the pressure from the chamber 24. The monitoring step 40 may include detecting a pressure increase in the chamber 24 as an indication of leakage of the pressure into the chamber 24.

Also described above is a method 34 example which can include: applying pressure to an internal chamber 24 of a well tool 12 at a surface location, thereby creating a first pressure differential in a first direction across a seal 28; and installing the well tool 12 in a well, thereby creating a second pressure differential in a second direction across the seal 28, the second direction being possibly opposite to the first direction.

The method 34 can also include monitoring the pressure in the internal chamber 24 using a pressure sensor 30 positioned in the internal chamber 24.

A well system 10 is also provided to the art by the above disclosure. In one example, the system 10 can comprise: a well tool 12 including an internal chamber 24, and a pressure sensor 30 disposed in the chamber 24, whereby the pressure sensor 30 detects pressure within the chamber 24.

The chamber 24 may be internally pressurized (or evacuated) at a surface location. The chamber 24 may be externally pressurized in a well. The chamber 24 may be internally pressurized at a downhole location.

The pressure sensor 30 can detect a pressure decrease as an indication of leakage of pressure from the chamber 24. The pressure sensor 30 can detect a pressure increase as an indication of leakage into the chamber 24.

The well tool 12 may also include a seal 28 which isolates the chamber 24 from well fluids. A first pressure differential can be applied across the seal 28 in a first direction at a surface location, and a second pressure differential can be applied across the seal 28 in a second direction possibly opposite to the first direction in a well. In some examples, the second pressure differential can be in the first direction, with the second pressure differential being greater than the first pressure differential.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method of pressure testing a well tool locatable in a well, the method comprising:
    adjusting the pressure in a sealed chamber of the well tool to pressurize or depressurize the sealed chamber prior to installing the well tool in the well, wherein the sealed chamber is formed by the well tool; then
    monitoring the pressure in the sealed chamber using a pressure sensor mounted in the sealed chamber; and then
    installing the well tool in the well.

2. The method of claim 1, further comprising monitoring the pressure in the sealed chamber after installing the well tool in the well using the pressure sensor.

3. The method of claim 1, wherein the adjusting further comprises applying the pressure to a seal, thereby creating a first pressure differential in a first direction across the seal.

4. The method of claim 3, wherein installing the well tool in the well further comprises creating a second pressure differential in a second direction across the seal, the second direction being opposite to the first direction.

5. The method of claim 3, wherein installing the well tool in the well further comprises creating a second pressure differential in the first direction across the seal, the second pressure differential being greater than the first pressure differential.

6. The method of claim 1, further comprising mounting the pressure sensor on an electronic printed circuit assembly.

7. The method of claim 1, wherein the monitoring further comprises detecting a pressure decrease in the chamber as an indication of leakage of the pressure from the chamber.

8. The method of claim 1, wherein the monitoring further comprises detecting a pressure increase in the chamber as an indication of leakage into the chamber.

9. A method, comprising:
    creating a first pressure differential in a first direction across a seal by pressurizing a sealed chamber of a well tool at a surface location prior to installing the well tool in a well, wherein the sealed chamber is formed by the well tool;

creating a second pressure differential in a second direction across the seal by installing the well tool in the well, the second direction being opposite to the first direction; and monitoring the pressure in the sealed chamber using a pressure sensor mounted in the sealed chamber.

10. The method of claim 9, wherein the installing is performed prior to the monitoring.

11. The method of claim 9, wherein the monitoring is performed prior to the installing.

12. The method of claim 9, wherein the monitoring further comprises detecting a pressure decrease in the chamber as an indication of leakage of the pressure from the chamber.

13. The method of claim 9, wherein the monitoring further comprises detecting a pressure increase in the chamber as an indication of leakage into the chamber.

14. The method of claim 9, wherein the pressure sensor is installed by mounting the pressure sensor on an electronic printed circuit assembly.

15. A well system for use in a well, comprising:
a well tool locatable in the well and including a sealed chamber formed by the well tool, the sealed chamber pressurized at a surface location at positive or negative pressure prior to installing the well tool in the well; and
a pressure sensor mounted in the sealed chamber and configured to detect a pressure in the sealed chamber.

16. The system of claim 15, wherein the sealed chamber is externally pressurized in the well.

17. The system of claim 15, wherein the pressure sensor is configured to detect a pressure decrease as an indication of leakage of pressure from the chamber.

18. The system of claim 15, wherein the pressure sensor is configured to detect a pressure increase as an indication of leakage into the chamber.

19. The system of claim 15, wherein the well tool further includes a seal which is configured to isolate the sealed chamber from well fluids.

20. The system of claim 19, wherein the seal is configured to withstand a first pressure differential applied across the seal in a first direction at a surface location and a second pressure differential applied across the seal in a second direction opposite to the first direction in a well.

21. The system of claim 19, wherein the seal is configured to withstand a first pressure differential applied across the seal in a direction at a surface location and a second pressure differential applied across the seal in the same direction, the second pressure differential being greater than the first pressure differential.

22. The system of claim 15, wherein the pressure sensor is mounted to an electronic printed circuit assembly.

23. The system of claim 15, wherein the pressure sensor comprises multiple redundant pressure sensors.

24. The system of claim 15, wherein the pressure sensor comprises multiple pressure sensors which measure pressures at respective different locations in the sealed chamber.

25. A well system for use in a well, comprising:
a well tool locatable in the well and including:
a sealed chamber formed by the well tool, the sealed chamber pressurized at positive or negative pressure prior to installing the well tool in the well; and
a seal functional to isolate the sealed chamber from well fluids and to withstand a first pressure differential applied across the seal in a first direction at a surface location and a second pressure differential applied across the seal in a second direction opposite to the first direction in the well; and
a pressure sensor mounted in the sealed chamber and configured to detect a pressure in the sealed chamber.

26. The well system of claim 25, wherein the second pressure differential is greater than the first pressure differential.

27. The system of claim 25, wherein the pressure sensor is mounted to an electronic printed circuit assembly.

28. The system of claim 25, wherein the pressure sensor is configured to detect a pressure increase as an indication of leakage into the chamber.

29. The system of claim 25, wherein the pressure sensor is configured to detect a pressure decrease as an indication of leakage of pressure from the chamber.

* * * * *